US008107892B2

(12) United States Patent
Moritsuka et al.

(10) Patent No.: US 8,107,892 B2

(45) Date of Patent: Jan. 31, 2012

(54) DIRECTIONAL COUPLER AND TRANSMITTING/RECEIVING APPARATUS

(75) Inventors: Fumi Moritsuka, Tokyo (JP); Toshiyuki Umeda, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 12/423,851

(22) Filed: Apr. 15, 2009

(65) Prior Publication Data

US 2010/0102897 A1 Apr. 29, 2010

(30) Foreign Application Priority Data

Oct. 28, 2008 (JP) ................................ 2008-276987

(51) Int. Cl.
*H04B 1/44* (2006.01)

(52) U.S. Cl. ........................................ 455/78; 333/109

(58) Field of Classification Search .......... 333/109–116; 455/78–80, 82, 83

See application file for complete search history.

(56) References Cited

U.S. PATENT DOCUMENTS

| | | | | |
|---|---|---|---|---|
| 4,628,321 | A * | 12/1986 | Martin | 342/379 |
| 6,545,542 | B2 * | 4/2003 | Matsuyoshi et al. | 330/301 |
| 2002/0067211 | A1 * | 6/2002 | Matsuyoshi et al. | 330/301 |

OTHER PUBLICATIONS

Yoshiro Konishi, et al., “Microwave Electronic Circuit Technology,” Nikkan Kogyo Shimbun, vol. 6, 2002, p. 55.

* cited by examiner

*Primary Examiner* — Lincoln Donovan
*Assistant Examiner* — William Hernandez
(74) *Attorney, Agent, or Firm* — Turocy & Watson, LLP

(57) ABSTRACT

A directional coupler has first to fourth input/output terminals, a first phase shifting unit which is connected between the first input/output terminal and the second input/output terminal, phase-shifts a supplied signal by 90° and outputs a resulting signal, a second phase shifting unit which is connected between the third input/output terminal and the fourth input/output terminal, phase-shifts a supplied signal by 90° and outputs a resulting signal, a first amplifier having an input connected to the third input/output terminal and an output connected to the first input/output terminal, and a second amplifier having an input connected to the fourth input/output terminal and an output connected to the second input/output terminal.

22 Claims, 8 Drawing Sheets

DIRECTIONAL COUPLER AND TRANSMITTING/RECEIVING APPARATUS

CROSS REFERENCE TO RELATED APPLICATION

This application is based upon and claims benefit of priority from the Japanese Patent Application No. 2008-276987, filed on Oct. 28, 2008, the entire contents of which are incorporated herein by reference.

BACKGROUND OF THE INVENTION

The present invention relates to a directional coupler and a transmitting/receiving apparatus.

In wireless transmitting/receiving systems in which transmission and reception are performed simultaneously, there is a problem in that the transmission signal can cause transmitter leakage in the receiver, degrading the reception sensitivity. In order to isolate the transmission and reception, a circulator is generally used. However, it is difficult to integrate a circulator into communication-use ICs. Moreover, the scale of the circuit is large and costs become higher.

One known method for solving this problem is to use a directional coupler. One known configuration of a directional coupler provided in a wireless transmitting/receiving system includes a first terminal connected to an antenna, a second terminal connected to a receiver, a third terminal connected to a transmitter, a fourth terminal connected to a termination impedance, a first phase shifter which is connected between the first terminal and the second terminal and causes a phase shift of $\pi/2$, a high-impedance first passive element made up of a capacitor and resistor or the like connected between the second terminal and the third terminal, a second phase shifter which is connected between the third terminal and the fourth terminal and causes a phase shift of $\pi/2$, and a high-impedance second passive element made up of a capacitor and resistor or the like connected between the first terminal and the fourth terminal (for example, refer to Yoshihiro Konishi et al., "Microwave electronic circuit technology vol. 6", Nikkan Kogyo Shimbun, 2002, p. 55).

In a directional coupler of such a configuration, the transmission signal from the transmitter which causes transmitter leakage in the receiver is removed at the second terminal through addition to a signal of reverse phase. Hence, noise in signal received by the receiver is reduced.

However, the transmission signal is passed through the high-impedance first passive element and the second passive element. Hence, losses occur in the transmission signal outputted to the antenna. To compensate for the losses, a gain of the power amplifier provided between the third terminal and the transmitter is increased. The increased gain causes the problem of an increase in power consumption.

SUMMARY OF THE INVENTION

According to one aspect of the present invention, there is provided a directional coupler comprising:

first to fourth input/output terminals;

a first phase shifting unit which is connected between the first input/output terminal and the second input/output terminal, phase-shifts a supplied signal by 90° and outputs a resulting signal;

a second phase shifting unit which is connected between the third input/output terminal and the fourth input/output terminal, phase-shifts a supplied signal by 90° and outputs a resulting signal;

a first amplifier having an input connected to the third input/output terminal and an output connected to the first input/output terminal; and a second amplifier having an input connected to the fourth input/output terminal and an output connected to the second input/output terminal.

According to one aspect of the present invention, there is provided a directional coupler comprising;

first to fourth input/output terminals;

first to (2N−1)th (where N is an integer of 2 or more) phase shifting units which are connected in series between the first input/output terminal and the second input/output terminal, each of the first to (2N−1)th phase shifting units phase-shifting a supplied signal by 90° and outputting an output signal;

2Nth to (4N−2)th phase shifting units which are connected in series between the third input/output terminal and the fourth input/output terminal, each of the 2Nth to (4N−2)th phase shifting units phase-shifting a supplied signal by 90° and outputting an output signal;

a first amplifier having an input connected to the third input/output terminal and an output connected to the first input/output terminal;

a (k+1)th (where k is an integer varying from 1 to 2N−2) amplifier having an output connected to connection point between the kth phase shifting unit and the (k+1)th phase shifting unit and an input connected to a connection point between the (k+2N−1)th phase shifting unit and the (k+2N)th phase shifting unit; and a 2Nth amplifier having an input connected to the fourth input/output terminal and an output connected to the second input/output terminal.

According to one aspect of the present invention, there is provided a transmitting/receiving apparatus comprising:

a directional coupler including first to fourth input/output terminals, a first phase shifting unit which is connected between the first input/output terminal and the second input/output terminal, phase-shifts a supplied signal by 90°, and outputs a resulting signal, a second phase shifting unit which is connected between the third input/output terminal and the fourth input/output terminal, phase-shifts a supplied signal by 90°, and outputs a resulting signal, a first amplifier having an input connected to the third input/output terminal and an output connected to the first input/output terminal, and a second amplifier having an input connected to the fourth input/output terminal and an output connected to the second input/output terminal;

an antenna which is connected to the second input/output terminal and transmits/receives signals;

a transmitter which generates and outputs a transmission signal;

a first amplifying unit including an input matching circuit and an output matching circuit, the first amplifying unit amplifying the transmission signal and outputting to the third input/output terminal;

a second amplifying unit including an input matching circuit and an output matching circuit, the second amplifying unit amplifying the signal outputted from the first input/output terminal and outputting an output signal; and a receiver which demodulates the output signal of the second amplifying unit.

According to one aspect of the present invention, there is provided a transmitting/receiving apparatus comprising:

a directional coupler including first to fourth input/output terminals,

1st to (2N−1)th (where N is an integer of 2 or more) phase shifting units which are connected in series between the first input/output terminal and the second input/output terminal, each of the 1st to (2N−1)th phase shifting units phase-shifting a supplied signal by 90° and outputting an output signal, 2Nth to (4N−2)th phase shifting units which are connected in series between the third input/output terminal and the fourth input/output terminal, each of the 2Nth to (4N−2)th phase shifting units phase-shifting a supplied signal by 90° and outputting an output signal, a first amplifier having an input connected to the third input/output terminal and an output connected to the first input/output terminal, and a (k+1)th (where k is an integer varying from 1 to 2N−2) amplifier having an output connected to connection point between the kth phase shifting unit and the (k+1)th phase shifting unit and an input connected to a connection point between the (k+2N−1)th phase shifting unit and the (k+2N)th phase shifting unit, and a 2Nth amplifier having an input connected to the fourth input/output terminal and an output connected to the second input/output terminal;

an antenna which is connected to the second input/output terminal and transmits/receives signals;

a transmitter which generates and outputs a transmission signal;

a first amplifying unit including an input matching circuit and an output matching circuit, the first amplifying unit amplifying the transmission signal and outputting to the third input/output terminal;

a second amplifying unit including an input matching circuit and an output matching circuit, the second amplifying unit amplifying the signal outputted from the first input/output terminal and outputting an output signal; and a receiver which demodulates the output signal of the second amplifying unit.

According to one aspect of the present invention, there is provided a transmitting/receiving apparatus comprising:

a directional coupler including first to fourth input/output terminals, a first phase shifting unit which is connected between the first input/output terminal and the second input/output terminal, phase-shifts a supplied signal by 90°, and outputs an output signal, a second phase shifting unit which is connected between the third input/output terminal and the fourth input/output terminal, phase-shifts a supplied signal by 90°, and outputs an output signal, a first amplifier having an input connected to the third input/output terminal and an output connected to the first input/output terminal, and a second amplifier having an input connected to the fourth input/output terminal and an output connected to the second input/output terminal;

an antenna which is connected to the second input/output terminal and transmits/receives signals;

a transmitter which generates and outputs a control signal;

a sinusoidal wave generator which outputs a sinusoidal transmission signal based on the control signal;

a first amplifying unit including an input matching circuit and an output matching circuit, the first amplifying unit amplifying the sinusoidal transmission signal and outputting to the third input/output terminal;

a second amplifying unit including an input matching circuit and an output matching circuit, the second amplifying unit amplifying the signal outputted from the first input/output terminal and outputting an output signal;

a third amplifying unit which amplifies the sinusoidal transmission signal and outputs an output signal;

a mixer which multiplies the output signal from the second amplifying unit and the output signal from the third amplifying unit and outputs an output signal;

a band pass filter which is supplied with the output signal from the mixer, passes signals of a predetermined band;

an A/D converter which converts the output signal of the band pass filter from an analog signal to a digital signal; and a receiver which decodes the output signal of the A/D converter.

DESCRIPTION OF THE EMBODIMENTS

The following describes embodiments of the present invention based on the drawings.

First Embodiment

Figure 1:
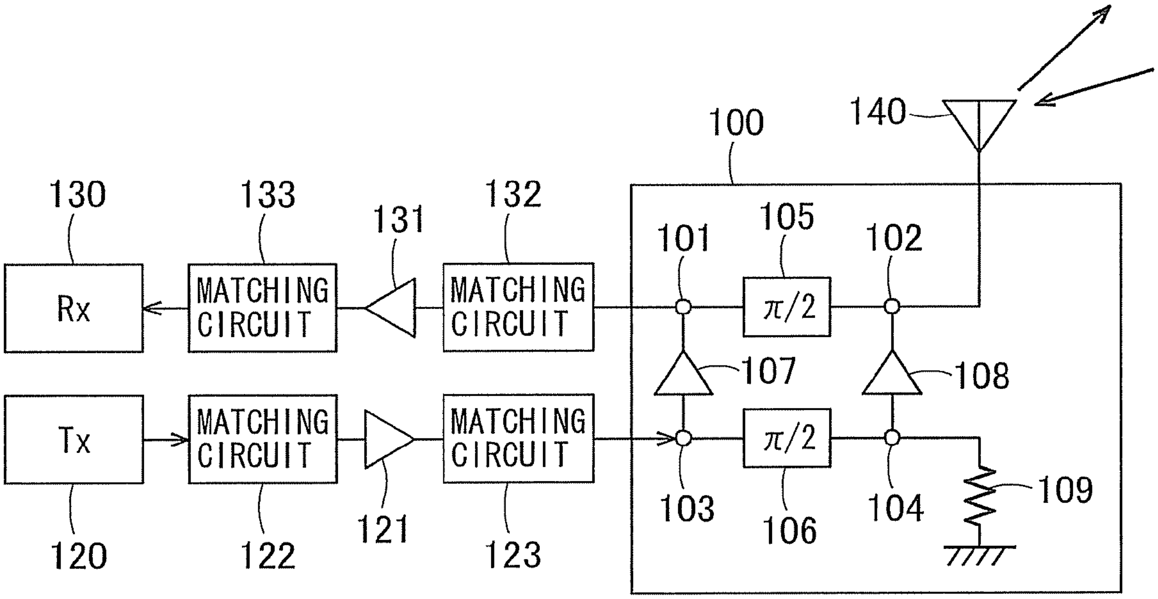
FIG. 1 is a schematic diagram showing a transmitting/receiving apparatus according to a first embodiment of the present invention.

FIG. 1 schematically shows a configuration of a transmitting/receiving apparatus according to a first embodiment of the present invention. The transmitting/receiving apparatus includes a directional coupler 100, a transmitter 120, a receiver 130, amplifiers 121 and 131, matching circuits 122, 123, 132 and 133, and an antenna 140, and is capable of simultaneously transmitting and receiving. The transmitter 120 generates and outputs a transmission signal. The receiver 130 demodulates a reception signal.

The directional coupler 100 includes input/output terminals 101 to 104, phase shifting means (units) 105 and 106, amplifiers 107 and 108 and a termination impedance 109. The input/output terminal 101 is connected to the matching circuit 132. The input/output terminal 102 is connected to the antenna 140. The input/output terminal 103 is connected to the matching circuit 123. The input/output terminal 104 is connected to the termination impedance 109.

The phase shifting means 105 is provided between the input/output terminal 101 and the input/output terminal 102. The phase shifting means 106 is provided between the input/output terminal 103 and the input/output terminal 104. The amplifier 107 is provided between the input/output terminal 101 and the input/output terminal 103. The amplifier 108 is provided between the input/output terminal 102 and the input/output terminal 104.

The matching circuits 122 and 123 are provided on the input side and output side of the amplifier 121, respectively. The matching circuits 122 and 123 perform matching to raise the input impedance and lower the output impedance of the amplifier 121.

Similarly, the matching circuits 132 and 133 respectively provided on the input and output sides of the amplifier 131 perform matching to raise the input impedance and lower the output impedance of the amplifier 131.

Such matching circuits are not, however, provided for the amplifiers 107 and 108, and the amplifiers 107 and 108 are amplifiers with high input/output impedance.

The phase shifting means 105 and 106 shift the phase of an input signal by π/2 (i.e. ¼ of one wavelength), and output the result. The phase shifting means 105 and 106 can be configured from phase shifters, delay devices, or a combination of phase shifters and delay devices.

The signal outputted from the transmitter 120 is amplified by the amplifier 121 and inputted to the input/output terminal 103. The signal inputted to the input/output terminal 103 takes two paths, one path including the phase shifting means 106 and the amplifier 108 and the other path including the amplifier 107 and the phase shifting means 105. The signals of the two paths are combined at the input/output terminal 102.

Since the signals of both paths are shifted by π/2 by the phase shifting means 105 and 106, the signals combined at the input/output terminal 102 are in phase. The signals which have passed along the respective paths are amplified by the amplifiers 107 and 108 using the same gain, and a signal with a high output power resulting from the addition of the two amplified signals is outputted (radiated) from the antenna 140.

On the other hand, a signal which passes along the path made up of the phase shifting means 106, the amplifier 108 and the phase shifting means 105 is phase-shifted by π with respect to a signal which has passed along the path including the amplifier 107. Hence, the signals which pass along these two paths are amplified using the same gain and are opposite in phase when combined at the input/output terminal 101. This reduces inputted components toward the receiver 130. Thus, the signal outputted from the transmitter 120 is prevented from causing transmitter leakage in the receiver 130.

A signal received by the antenna 140 is inputted to the input/output terminal 102, phase-shifted by π/2 by the phase shifting means 105, and outputted from the input/output terminal 101 to the amplifier 131. The signal outputted from the input/output terminal 101 is amplified by the amplifier 131 and demodulated by the receiver 130.

Since the input and output impedances of the amplifiers 107 and 108 are high, the strength of the part of reception signal which passes along the path made up of the amplifier 108, the phase shifting means 106, and the amplifier 107 is very weak.

Figure 2:
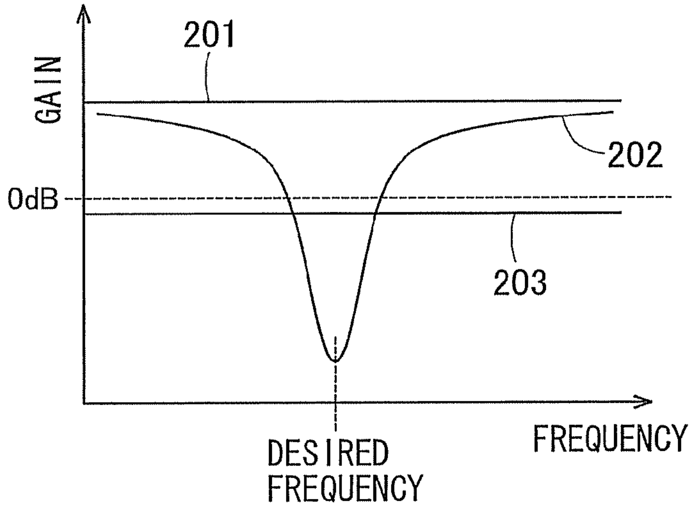
FIG. 2 is a graph showing an example of the input/output characteristic of a directional coupler.

FIG. 2 is a plot of an example of input/output characteristic of the directional coupler 100. FIG. 2 shows an input/output characteristic 201 from the input/output terminal 103 to the input/output terminal 102, an input/output characteristic 202 from the input/output terminal 103 to the input/output terminal 101, and an input/output characteristic 203 from the input/output terminal 102 to the input/output terminal 101.

From the input/output characteristic 201, it can be seen that a transmission signal resulting from amplification by precisely the gain of the amplifiers 107 and 108 is outputted from the input/output terminal 102. From the input/output characteristic 202, it can be seen that the transmission signal component outputted from the input/output terminal 101 is attenuated at a desired frequency. From the input/output characteristic 203, it can be seen that, from the input/output terminal 101, the reception signal is outputted with almost no attenuation.

In this way, a transmission signal with a high output power is outputted from the input/output terminal 102. Hence, the gain requirement in the amplifier 121 on the transmission side is eased, and the electrical power consumption of the transmitting/receiving apparatus can be reduced. Further, at the input/output terminal 101, transmitter leakage caused by the output signal of the transmitter 120 is prevented, and a reception signal with suppressed losses is outputted.

According to the present embodiment, it is possible to reduce the losses of the transmission signals in the directional coupler and reduce the power consumption of the transmitting/receiving apparatus.

Figure 3:
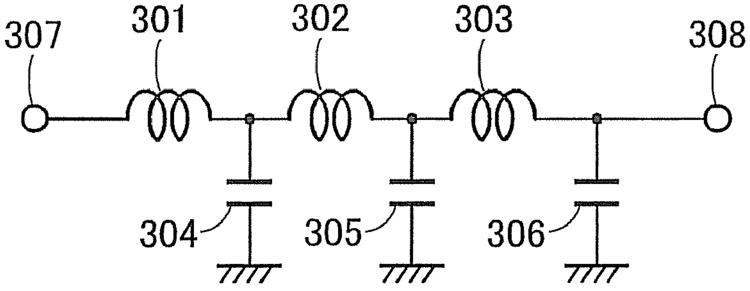
FIG. 3 is a diagram showing an example configuration of phase-shifting means.

The phase shifting means 105 and 106 may, as shown in FIG. 3, be configured from inductive elements 301 to 303 connected in series between the input terminal 307 and the output terminal 308, a capacitive element 304 having one terminal connected to a connection point between the inductive element 301 and the inductive element 302 and the other terminal connected to ground, a capacitive element 305 having one terminal connected to a connection point between the inductive element 302 and the inductive element 303 and the other terminal connected to ground and a capacitive element 306 having one terminal connected to a connection point between the inductive element 303 and an output terminal 308 and the other terminal connected to ground.

Figure 4:
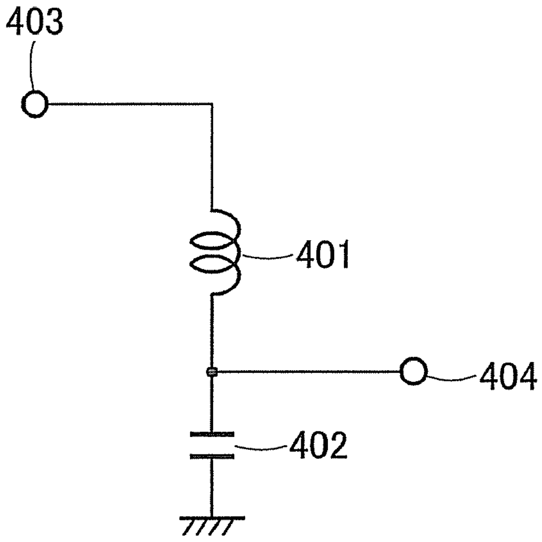
FIG. 4 is a diagram showing an example configuration of phase-shifting means.

Further, the phase shifting means 105 and 106 may, as shown in FIG. 4 be configured from an inductive element 401 having one terminal connected to an input terminal 403 and a capacitive element 402 having one terminal connected to an output terminal 404 and the other terminal of the inductive element 401 and the other terminal connected to ground.

Figure 5:
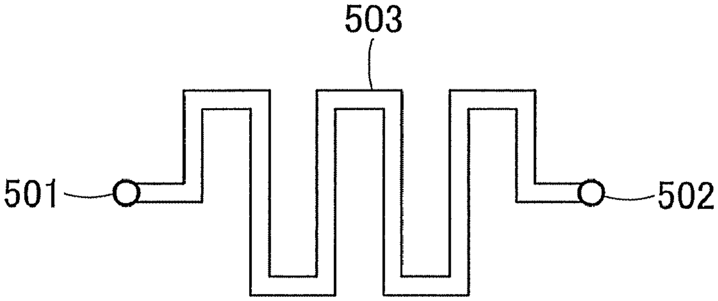
FIG. 5 is a diagram showing an example configuration of phase-shifting means.

Further, the phase shifting means 105 and 106 may, as shown in FIG. 5, be configured by providing, between an input terminal 501 and an output terminal 502, a wire path 503 having a length which is ¼ of the wavelength of the transmission signal wavelength.

By using configurations of the type shown in FIGS. 3 to 5 for the phase shifting means 105 and 106, it is possible to reduce scale of the circuit in comparison to when a configuration of phase-shifters or delay devices is used, and thereby reduce cost.

In the above-described embodiment, the gains of the amplifiers 107 and 108 are described as being the same. However, when the phase shifting means 105 and 106 have an associated insertion loss, the gain of the of the amplifier 108 may set to be larger than the gain of amplifier 107 by an amount substantially corresponding to the insertion losses of the phase shifting means 105 and 106.

In other words, gain of amplifier 108=gain of amplifier 107+(−(insertion loss of phase shifting means 105+insertion loss of phase shifting means 106)). Here, the minus sign is added because the insertion losses are assumed to be negative values. Hence, by using the expression "insertion loss amount" which is a positive value, the above expression can be written as: gain of amplifier 108=gain of amplifier 107+ insertion loss amount of phase shifting means 105+insertion loss amount of phase shifting means 106.

Thus, by setting gain of the amplifier 108 to a value found by adding the loss amounts of the phase shifting means 105 and the phase shifting means 106 to the gain of the amplifier 107 (i.e. to a value which is larger than the gain of the amplifier 107), it is possible to further attenuate the transmission signal component which causes transmitter leakage in the receiver 130 and further improve the reception characteristic.

The directional coupler 100 may be configured without the termination impedance 109. Further, when sufficient gain is obtained using the amplifiers 107 and 108, the amplifier 121 (and the matching circuits 122 and 123) needs not be provided.

Second Embodiment

Figure 6:
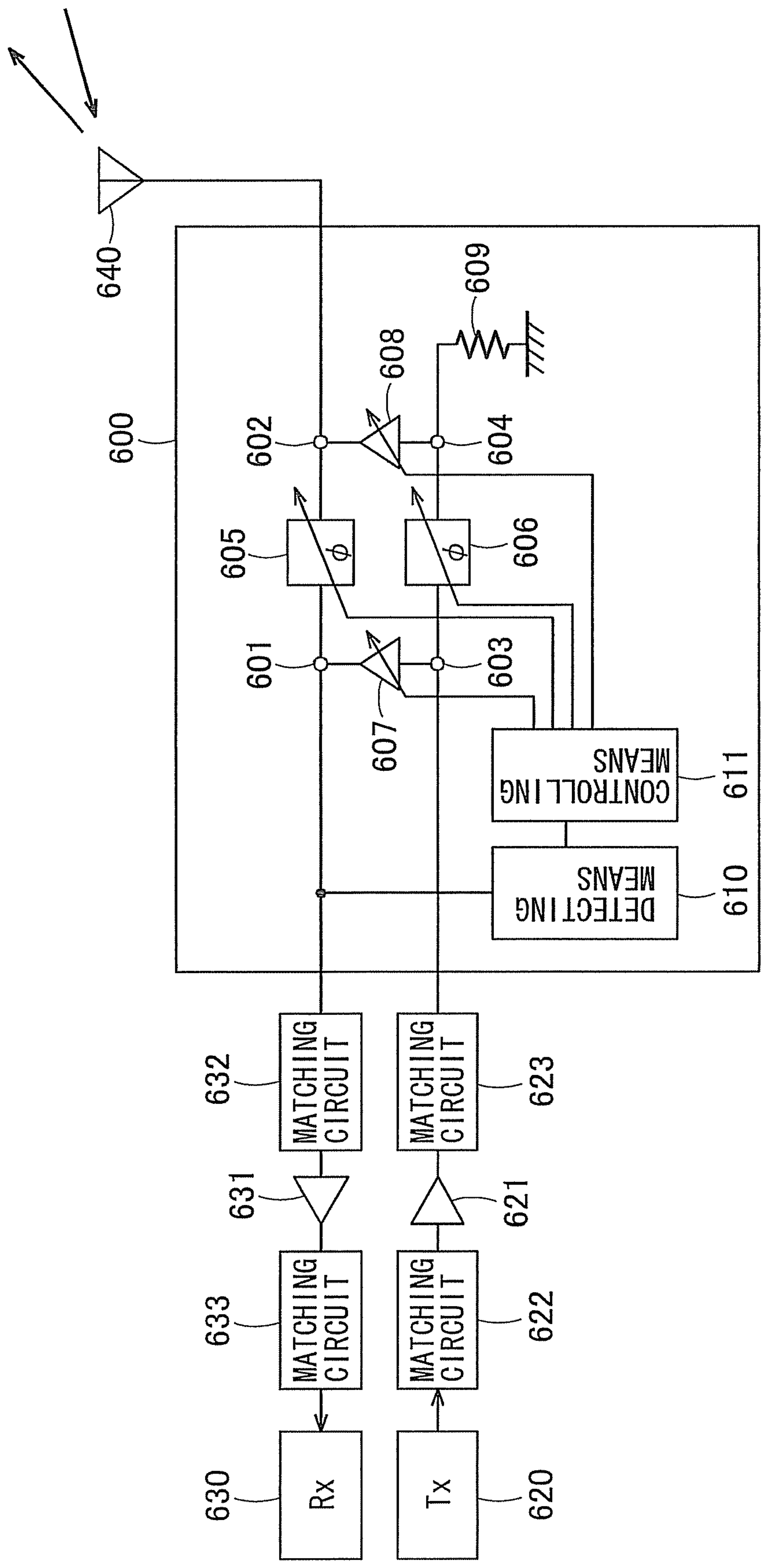
FIG. 6 is a schematic diagram showing a transmitting/receiving apparatus according to a second embodiment of the present invention.

FIG. 6 schematically shows a configuration of a transmitting/receiving apparatus according to a second embodiment of the present invention. The transmitting/receiving apparatus includes a directional coupler 600, a transmitter 620, a receiver 630, amplifiers 621 and 631, matching circuits 622, 623, 632 and 633, and an antenna 640, and is capable of simultaneously transmitting and receiving.

The transmitter 620, the receiver 630, the amplifiers 621 and 631, the matching circuits 622, 623, 632 and 633, and the antenna 640 are, respectively, substantially the same as the transmitter 120, the receiver 130, the amplifiers 121 and 131, the matching circuits 122, 123, 132 and 133 and the antenna 140 of the above-described first embodiment, and hence further description of these components is omitted below.

The directional coupler 600 includes input/output terminals 601 to 604, variable phase shifting means (units) 605 and 606, variable gain amplifiers 607 and 608, a terminal impedance 609, detecting means (a detecting unit) 610, and controlling means (a controlling unit) 611.

The input/output terminal 601 is connected to the matching circuit 632. The input/output terminal 602 is connected to the antenna 640. The input/output terminal 603 is connected to the matching circuit 623. The input/output terminal 604 is connected to the termination impedance 609.

The variable phase shifting means 605 is provided between the input/output terminal 601 and the input/output terminal 602. The variable phase shifting means 606 is provided between the input/output terminal 603 and the input/output terminal 604. The variable gain amplifier 607 is provided between the input/output terminal 601 and the input/output terminal 603. The variable gain amplifier 608 is provided between the input/output terminal 602 and the input/output terminal 604.

In a similar way to the above-described first embodiment, the transmission signals outputted from the transmitter 620 along the two paths are amplified by the variable gain amplifiers 607 and 608 and added at the input/output terminal 602, thereby increasing the output power from the antenna 640. Hence, the power consumption of the amplifier 621 can be reduced. Further, transmitter leakage by the transmission signal on the receiver 630 side is suppressed.

The detecting means 610 monitors the phase and power level of the signal outputted from the input/output terminal 601 to the amplifier 631 (i.e. the matching circuit 632), and detects a reception characteristic. The controlling means 611 adjusts at least one of the phase shift amounts of the variable phase shifting means 605 and 606 and the gains of the variable gain amplifier 607 and 608 so that the reception characteristic attains predetermined values.

For instance, the detecting means 610 detects the signal power of a signal outputted from the input/output terminal 601 and the controlling means 611 adjusts the gains and/or phase shift amounts so as to reduce the signal power.

Further, known signals may be inputted to the directional coupler 600, and an evaluation function may be set up based the known signals and the signals outputted from the input/output terminal 601, which are detected by the detecting means 610. A suitable algorithm such as an LMS (Least Mean Square) algorithm, an RLS (Recursive Least Square) algorithm may be applied in the evaluation function to allow the controlling means 611 to perform the adjustments of gain and/or phase shift amount.

Alternatively, the detecting means 610 may detect one or more of an error rate, an EVM (Error Vector Magnitude) or SNR (Signal Power to Noise Ratio) of the reception signal as the reception characteristic, and the controlling means 611 may adjust the gains and/or phase shift amounts so as to improve the reception characteristic.

When errors occur over time in the variable phase shifting means 605 and 606 or the variable gain amplifiers 607 and 608, the detecting means 610 and the controlling means 611 detect the errors, and, by adjusting the gain and phase, attenuate the transmission signal component which causes transmitter leakage on the receiver 630 side and thereby improves the reception characteristic.

Figure 7:
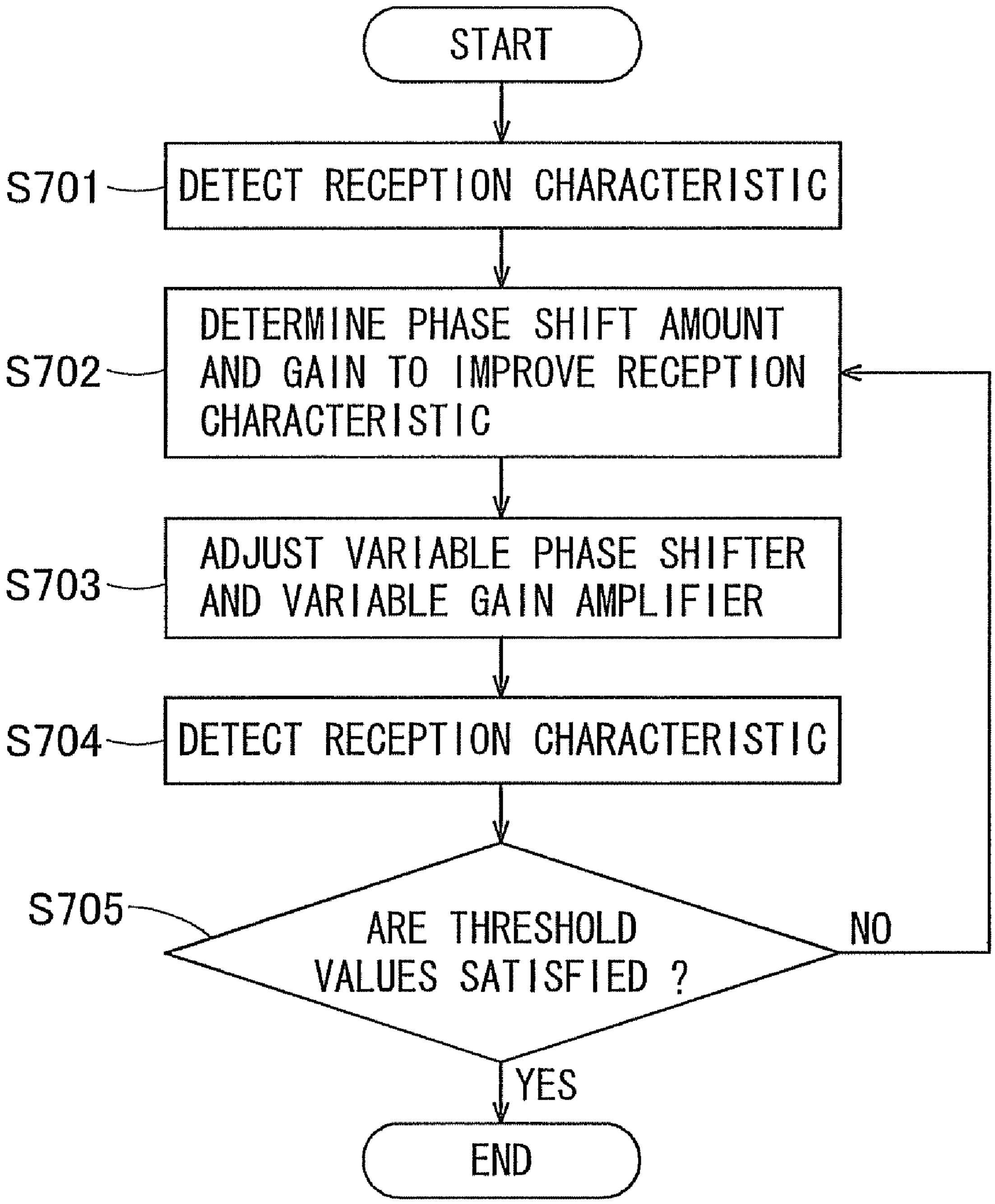
FIG. 7 is a flowchart describing operations of detecting means and controlling means according to the second embodiment.

The operations of the detecting means 610 and the controlling means 611 are described using the flow chart shown in FIG. 7.

(Step S701) The detecting means 610 detects the reception characteristic.

(Step S702) Phase shift amounts of the variable phase shifting means 605 and 606 and gains of the variable gain amplifiers 607 and 608 for improving the reception characteristic are calculated. The calculation of the phase shift amounts and gains may be performed by the detecting means 610 or by the controlling means 611.

(Step S703) Based on the phase shift amounts and gains calculated in step S702, the controlling means 611 adjusts the phase shift amounts of the variable phase shifting means 605 and 606 and the gains of the variable gain amplifiers 607 and 608.

(Step S704) The detecting means 610 detects the reception characteristic.

(Step S705) It is determined whether the reception characteristic detected in step S704 satisfies predetermined threshold values (i.e. whether the values are within a predetermined range). When the reception characteristic satisfies the predetermined threshold values, the operations end. When the reception characteristic does not satisfy the predetermined threshold values, the processing returns to step S702.

Here, the adjustment of the gain and phase may be performed when the power is in the apparatus is switched on or repeated at a fixed interval.

Thus, according to the present embodiment, it is possible to reduce the losses of the transmission signal in the directional coupler and reduce the power consumption of the transmitting/receiving apparatus. Further, it is possible to prevent the reception characteristic being degraded by errors which occur as time passes in the variable gain amplifiers and variable phase shifting means included in the directional coupler.

In the second embodiment, the detecting means 610 detects the reception characteristic from the signal outputted from the input/output terminal 601. However, the detecting means 610 may be connected to the receiver 630 and detect the reception characteristic from the signal inputted to the receiver 630.

Figure 8:
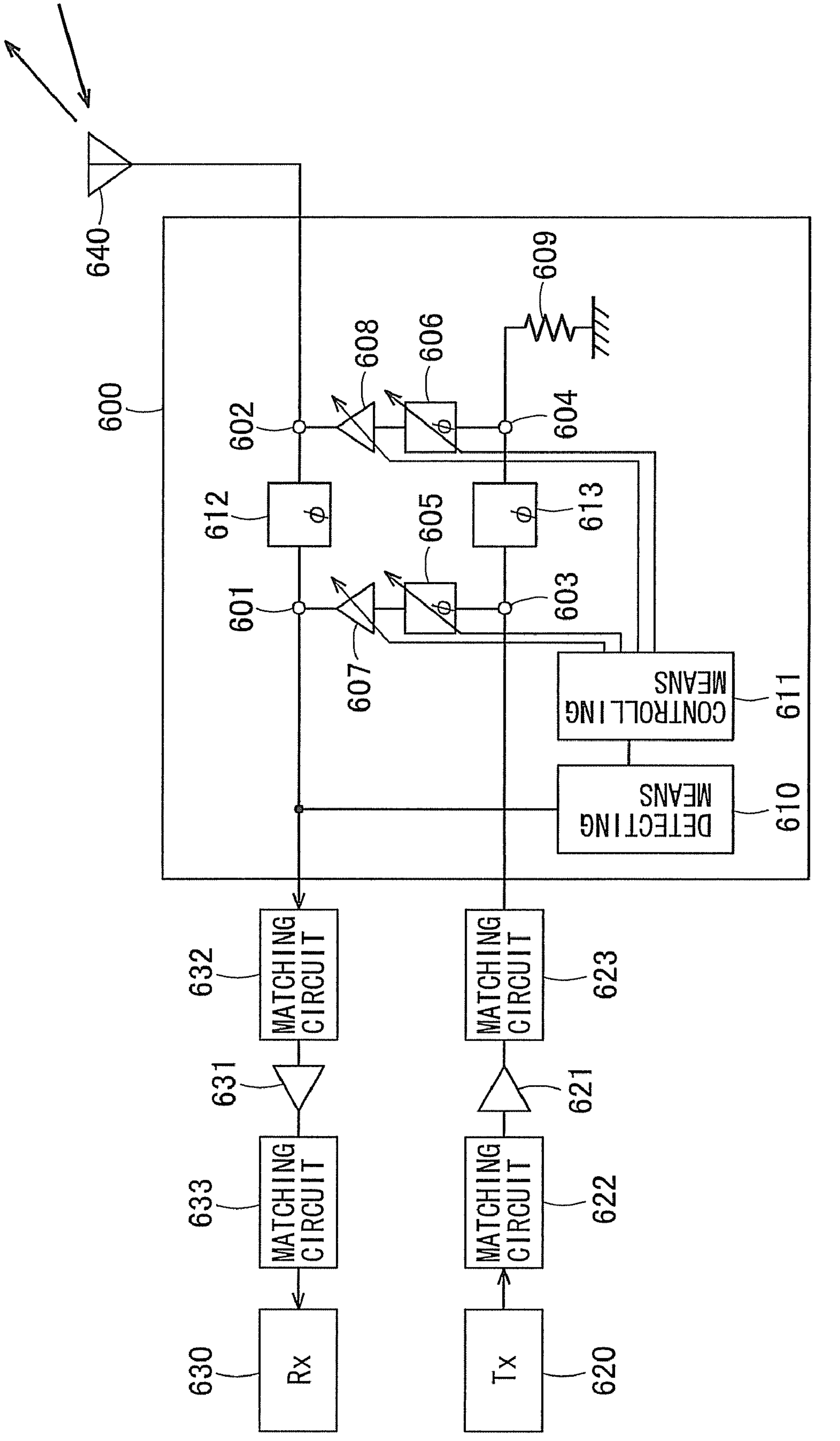
FIG. 8 is a schematic diagram showing a transmitting/receiving apparatus according a modification example.

Alternatively, as shown in FIG. 8, the directional coupler 600 may further include phase shifting means 612 and 613, which do not allow variation in the phase shift amount, and variable phase shifting means 605 and 606 may be provided so as to precede (or follow) the variable gain amplifiers 607 and 608.

When errors which occur as time passes in the variable phase shifting means 605 and 606 and the variable gain amplifiers 607 and 608 are small, the phase and gain may be adjusted to optimal values for achieving the desired characteristic before shipping and the detecting means 610 and the controlling means 611 may be omitted. It is then possible to reduce the scale of the circuit.

Third Embodiment

Figure 9:
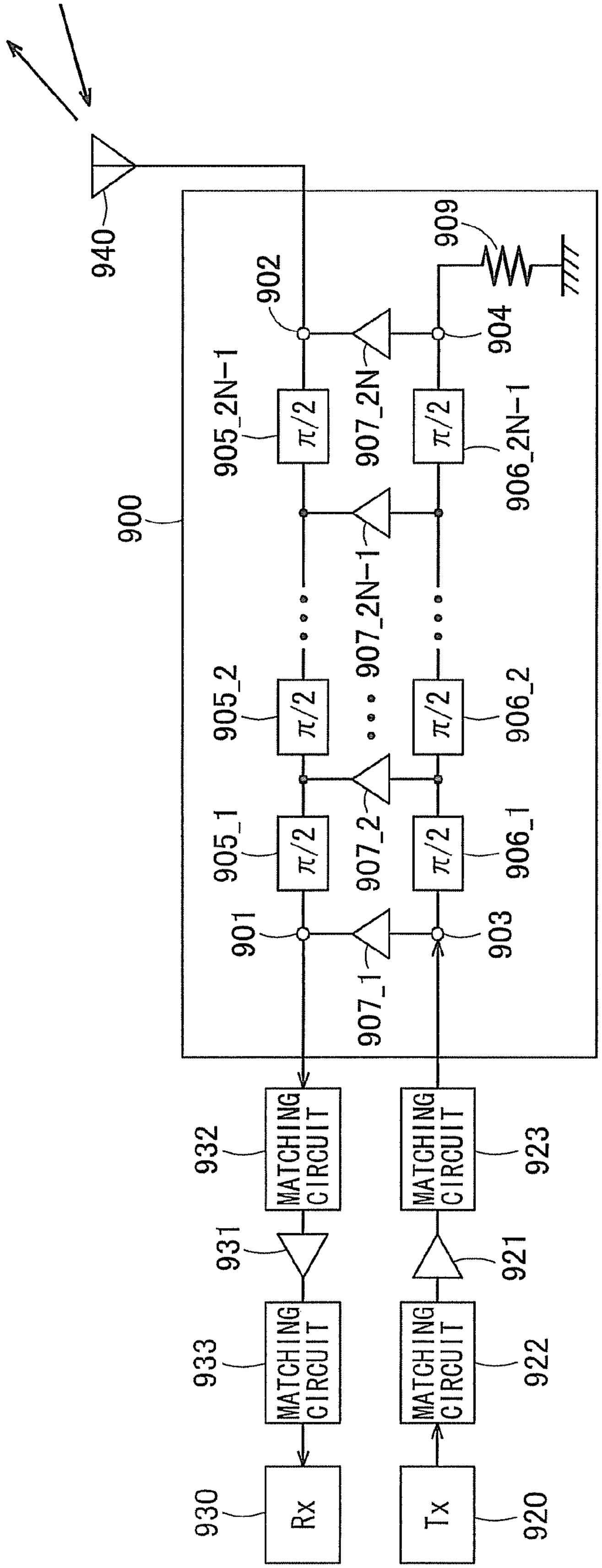
FIG. 9 is a schematic diagram showing a transmitting/receiving apparatus according to a third embodiment of the present invention.

FIG. 9 schematically shows a configuration of a transmitting/receiving apparatus according to a third embodiment of the present invention. The transmitting/receiving apparatus includes a directional coupler 900, a transmitter 920, a receiver 930, amplifiers 921 and 931, matching circuits 922, 923, 932 and 933, and an antenna 940, and is capable of simultaneously transmitting and receiving.

The transmitter 920, the receiver 930, the amplifiers 921 and 931, the matching circuits 922, 923, 932 and 933 and the antenna 940 are, respectively, substantially the same as the transmitter 120, the receiver 130, the amplifiers 121 and 131, the matching circuits 122, 123, 132 and 133 and the antenna 140 of the above-described first embodiment, and hence further description of these components is omitted below.

The directional coupler 900 includes input/output terminals 901 to 904, phase shifting means (units) 905_1 to 905_2N−1 and phase shifting means (units) 906_1 to 906_2N−1, an even number of amplifiers 907_1 to 907_2N, and a termination impedance 909, where "N" denotes an integer that is greater than or equal to "2".

The input/output terminal 901 is connected to the matching circuit 932. The input/output terminal 902 is connected to the antenna 940. The input/output terminal 903 is connected to the matching circuit 923. The input/output terminal 904 is connected to the termination impedance 909.

The odd number of phase shifting means 905_1 to 905_2N−1 are connected in series between the input/output terminal 901 and the input/output terminal 902. The odd number of phase shifting means 906_1 to 906_2N−1 are connected in series between the input/output terminal 903 and the input/output terminal 904.

The amplifier 907_1 is connected between the input/output terminal 901 and the input/output terminal 903. The amplifier 907_2N is connected between the input/output terminal 902 and the input/output terminal 904. The amplifier 907_*k* (where k is an integer satisfying $2 \leqq k \leqq 2N-1$) is connected between a connection point of the phase shifting means 905_*k*−1 and the phase shifting means 905_*k* and a connection point of the phase shifting means 906_*k*−1 and the phase shifting means 906_*k*.

The amplifiers 907_1 to 907_2N are amplifiers with a high input and output impedance in the same way as the amplifiers 107 and 108 in the above-described first embodiment.

Parts of the transmission signal outputted from the transmitter 920 and inputted to the input/output terminal 903 are, whichever paths is taken, amplified by one of the amplifiers 907_1 to 907_2N and added as in-phase signals at the input/output terminal 902. Hence, the output power from the antenna 940 is increased. Further, since the amplifiers of the directional coupler 900 are configured using multiple stages, the gain of any single amplifier is reduced and a high-power transmission signal can be outputted from the input/output terminal 902.

As a result, it is possible to reduce the power consumption of the amplifier 921 that is provided at an earlier stage in the directional coupler 900. Further, the multistage amplifier allows wide-band amplification of a signal with a wide bandwidth. It is also possible to reduce the power consumption of the termination impedance 909.

The parts of the transmission signal which are outputted from the transmitter 920 and causes transmitter leakage on the receiver 930 side via the input/output terminal 901 have a phase difference of π for any path in the directional coupler 900, and are therefore added as reverse phase signals at the input/output terminal 901. Hence, the transmission signal component which causes transmitter leakage on the receiver 930 side can be reduced.

The transmission signal component which causes transmitter leakage on the receiver side is also affected by errors in the phase shifting means and amplifiers included in the directional coupler. However, because the directional coupler 900 has a multi-stage configuration, the permissible amount of error is increased and the reception characteristic can be further improved.

Thus, according to the present embodiment, it is possible to reduce the losses of the transmission signals in the directional coupler and reduce the power consumption of the transmitting/receiving apparatus. Further, it is possible to increase the amount of error permissible in the amplifiers and the phase shifting means included in the directional coupler to further improve the reception characteristic.

In the third embodiment, when insertion losses are generated in the phase shifting means 905_1 to 905_2N−1 and 906_1 to 906_2N−1, the gain of the amplifier 907_*j* (where j is an integer which satisfies $2 \leqq j \leqq 2N$) may be set to be larger than the gain of the amplifier 907_*j*−1 by the insertion loss amounts of the phase shifting means 905_*j*−1 and 906_*j*−1.

In other words, the gains of the amplifier 907_1 to 907_2N are set so that: gain of the amplifier 907_1<gain of amplifier 907_2<. . . <gain of amplifier 907_2N−1<gain of amplifier 907_2N. As a result, it is possible to further attenuate the transmission signal component which causes interference in the receiver 930 and further improve the reception characteristic.

Fourth Embodiment

Figure 10:
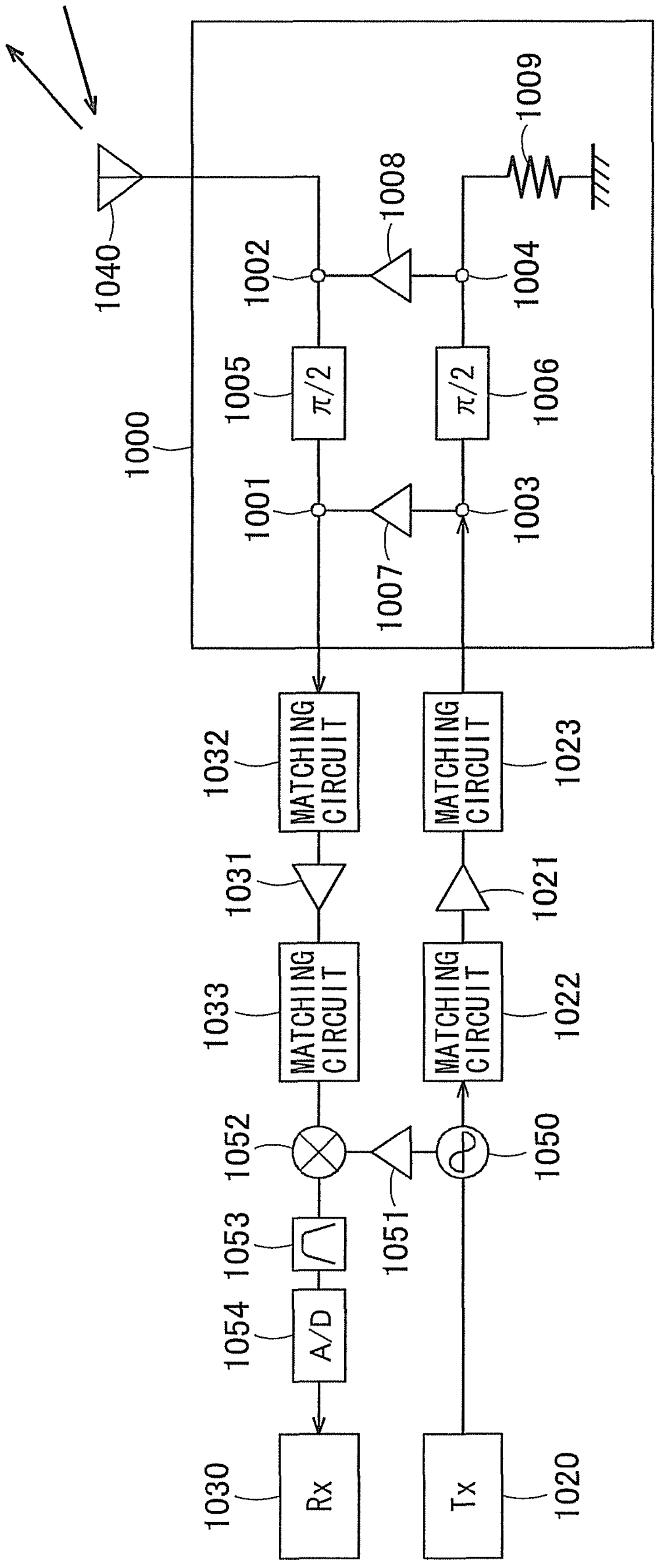
FIG. 10 is a schematic diagram showing a transmitting/receiving apparatus according to a fourth embodiment of the present invention.

FIG. 10 shows a schematic configuration of the transmitting/receiving apparatus according to a fourth embodiment of the present invention. The transmitting/receiving apparatus is an RFID reader-writer which includes a directional coupler 1000, a transmitter 1020, a receiver 1030, amplifiers 1021 and 1031, matching circuits 1022, 1023, 1032 and 1033, an antenna 1040, a sinusoidal wave generator 1050, an amplifier 1051, a mixer 1052, a band pass filter 1053 and an A/D converter 1054.

The directional coupler 1000, the amplifiers 1021 and 1031, the matching circuits 1022, 1023, 1032 and 1033 and the antenna 1040 are, respectively, substantially the same as the directional coupler 100, the amplifiers 121 and 131, the matching circuits 122, 123, 132 and 133 and the antenna 140 in the first embodiment shown in FIG. 1, and hence further description of these components is omitted below.

The transmitter 1020 outputs a control signal to cause the sinusoidal wave generator 1050 to operate. The sinusoidal wave generator 1050 outputs a sinusoidal transmission signal based on the control signal. The signal outputted from the sinusoidal wave generator 1050 is amplified by the amplifier 1021 and inputted to the input/output terminal 1003 of the directional coupler 1000.

The signal inputted to the input/output terminal 1003 is divided into two parts. One part is the signal resulting from combining, at the input/output terminal 1002, the signals passing along a path made up of the phase shifting means (unit) 1006 and the amplifier 1008 and a path made up of the amplifier 1007 and the phase shifting means (unit) 1005. The other part is the signal resulting from combining, at the input/output terminal 1001, the signals passing along a path made up of the phase shifting means 1006, the amplifier 1008, the phase shifting means 1005 and a path made up of the amplifier 1007.

The signals combined at the input/output terminal 1002 are in phase when added and the signal is therefore strengthened and radiated from the antenna 1040. The signals reaching the input/output terminal 1001, on the other hand, are of opposite phase and disappear when combined.

The reception signal incident on the antenna 1040 and inputted to the input/output terminal 1002 is of the same frequency as the transmission signal and is passed through the phase shifting means 1005 and thereby phase-shifted by $\pi/2$. The resulting signal is outputted from the input/output terminal 1001. The reception signal outputted from the input/output terminal 1001 is amplified before output by the amplifier 1031 and then multiplied in the mixer 1052 by a sinusoidal wave signal which has been outputted by the sinusoidal wave generator 1050 and amplified by the amplifier 1051. The output signal of the mixer 1052 is filtered to eliminate all but a desired frequency by the band pass filter 1053. The filtered signal is then converted to a digital signal by the A/D converter 1054, and decoded by the receiver 1030.

Thus, according to the present embodiment, the gain requirement in the amplifier 1021 on the transmission side is relaxed, and an RFID reader-writer with reduced power consumption can be realized.

When the transmission and receiving frequencies are the same, transmitter leakage on the receiver side caused by the transmission signal component is a particular problem. In the present embodiment, however, it is possible to efficiently reduce the transmitter leakage caused by the transmission signal component, and consequently to improve the reception characteristic.

The phase shifting means 1005 and 1006 of the directional coupler 1000 may be constructed using inductive elements and capacitive elements as shown in FIG. 3 and FIG. 4. Since such an arrangement can be wholly included on a single chip, it is possible to reduce the scale of the circuit.

Fifth Embodiment

Figure 11:
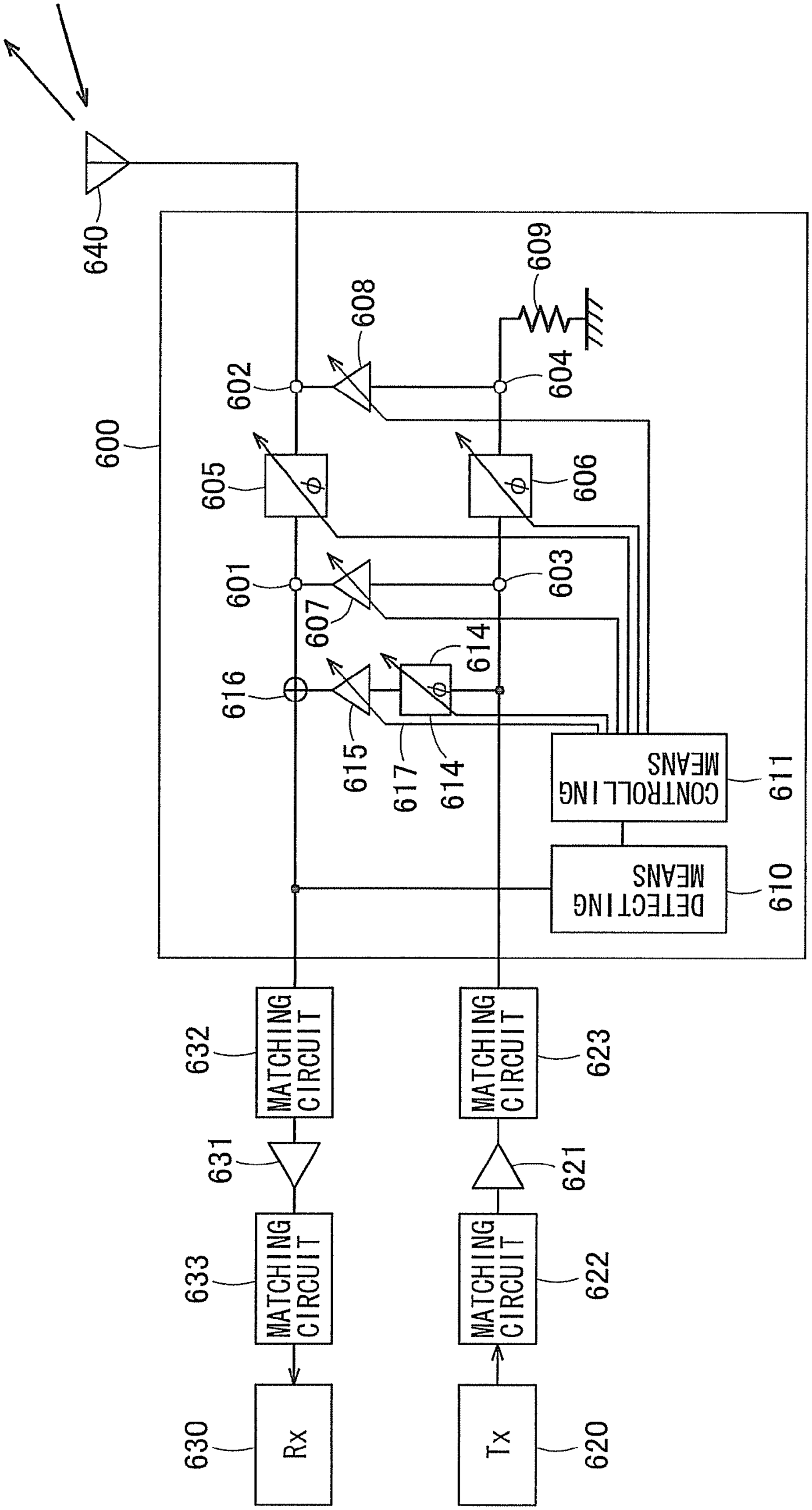
FIG. 11 is a schematic diagram showing a transmitting/receiving apparatus according to a fifth embodiment of the present invention.

FIG. 11 shows a schematic configuration of a transmitting/receiving apparatus according to a fifth embodiment of the present invention. The transmitting/receiving apparatus is configured form the directional coupler 600 of the transmitting/receiving apparatus according to the second embodiment shown in FIG. 6, and further includes compensating means 617 and an adder 616. The compensating means 617 is connected between the input/output terminal 603 and the adder 616, performs a phase shift and amplification of the input signal, and outputs a compensation signal to the adder 616. The adder 616 adds the signal outputted from the input/output terminal 601 and the compensation signal outputted from compensating means 617 and outputs the result.

The compensating means 617 is connected to the input/output terminal 603 and includes variable phase shifting means 614 which phase-shifts the input signal and outputs an output signal, and a variable gain amplifier 615 which amplifies the output signal from the variable phase shifting means 614 and outputs to the adder 616.

The phase shift amount caused by the variable phase shifting means 614 and the gain of the variable gain amplifier 615 are adjusted by the controlling means 611. The variable phase shifting means 614 shifts the phase of the transmission signal outputted from the transmitter 620 and amplified by the amplifier 621 and outputs the result. The variable gain amplifier 615 amplifies the output of the variable phase shifting means 614 and outputs the compensation signal. The adder 616 adds the compensation signal outputted from the variable gain amplifier 615 and the output from the input/output terminal 601 and outputs the result to the amplifier 631 (i.e. the matching circuit 632).

The transmission signal outputted from the transmitter 620 and combined and outputted by the input/output terminal 601 is, for ideal values of gain in the variable gain amplifiers 607 and 608 and phase shift in the variable phase shifting means 605 and 606, added to a signal of reverse phase and cancelled out. However, when the device mismatches occur, the transmission signal component is not completely cancelled out and a signal is outputted from the input/output terminal 601.

Hence, the compensation signal is generated by adjusting the phase and the amplitude using the variable phase shifting means 614 and the variable gain amplifier 615. The transmission signal is then suppressed by adding the compensation signal to the part of transmission signal outputted from the input/output terminal 601 which, due to the errors in the variable phase shifting means 605 and 606 and the variable gain amplifiers 607 and 608, has not been completely cancelled out.

According to this configuration, the compensation signal generated by the variable phase shifting means 614 and the variable gain amplifier 615 is added to the remaining part of the transmission signal by the adder 616. Since the transmission signal which causes transmitter leakage on the receiver 630 side is thereby suppressed, it is possible to further improve the reception characteristic even when the device mismatches occur.

In the above-described fifth embodiment, the variable phase shifting means 614 is provided at a preceding stage to the variable gain amplifier 615 in the compensating means 617. However, the variable phase shifting means may be provided at a stage following the phase shifting means. Further, the variable gain amplifier 615 may be a variable attenuator.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A directional coupler comprising:

first to fourth input/output terminals;

a first phase shifting unit which is connected between the first input/output terminal and the second input/output terminal, phase-shifts a supplied signal by 90° and outputs a resulting signal;

a second phase shifting unit which is connected between the third input/output terminal and the fourth input/output terminal, phase-shifts a supplied signal by 90° and outputs a resulting signal;

a first amplifier having an input connected to the third input/output terminal and an output connected to the first input/output terminal; and a second amplifier having an input connected to the fourth input/output terminal and an output connected to the second input/output terminal.

2. The directional coupler according to claim 1, further comprising an impedance element having one terminal connected to the fourth input/output terminal and the other terminal connected to ground.

3. The directional coupler according to claim 1, wherein a gain of the second amplifier is given by adding loss amounts of the first and second phase shifting units to a gain of the first amplifier.

4. The directional coupler according to claim 1, wherein the first phase shifting unit and the second phase shifting unit are variable phase shifters having adjustable phase shift amounts and the first amplifier and the second amplifier are variable gain amplifiers having adjustable gains.

5. The directional coupler according to claim 4, further comprising:

a detecting unit which detects a phase and a power level of a signal outputted from the first input/output terminal, and determines, based on the phase and the power level, an adjustment amount for the phase shift amounts of the first phase shifting unit and the second phase shifting unit and an adjustment amount for the gain of the first amplifier and the second amplifier; and a controlling unit which, based on the adjustment amount for the phase shift amount and the adjustment amount for the gain determined by the detecting unit, adjusts the phase shift amounts of the first phase shifting unit and the second phase shifting unit and the gains of the first amplifier and the second amplifier.

6. The directional coupler according to claim 5, further comprising: a compensating unit having an adjustable phase shift amount and gain, the compensating unit having one terminal connected to the third input/output terminal, performing a phase shift and amplification on a supplied signal and outputting an output signal; and an adder which adds an output signal from the first input/output terminal and the output signal from the compensating unit and outputs a signal, wherein the detecting unit detects a phase and power level of the signal outputted from the adder and, based on the phase and the power level, determines adjustment amounts for the phase shift amounts of the first phase shifting unit, the second phase shifting unit and the compensating unit, and adjustment amounts for the gains of the first amplifier, the second amplifier and the compensating unit, and the controlling unit, based on the adjustment amounts for the phase shift amounts and the adjustment amounts for the gains determined by the detecting unit, adjusts the phase shift amounts of the first phase shifting unit, the second phase shifting unit, and the compensating unit and for the gains of the first amplifier, the second amplifier and the compensating unit.

7. The directional coupler according to claim 6, wherein the compensating unit includes:

a third phase shifting unit having an adjustable phase shift amount, the third phase shifting unit having one terminal connected to the third input/output terminal, phase-shifting a supplied signal and outputting an output signal; and a third amplifier having an adjustable gain, amplifying the output from the third phase shifting unit and outputting to the adder, wherein the detecting unit determines an adjustment amount for the phase shift amount of the third phase shifting unit and an adjustment amount for the gain of the third amplifier, and the controlling unit adjusts the phase shift amount of the third phase shifting unit and the gain of the third amplifier.

8. The directional coupler according to claim 1 wherein the first amplifier and the second amplifier are variable gain amplifiers having adjustable gains, the directional coupler further comprising:

a first variable phase shifting unit having an adjustable phase shift amount and provided one of between the first amplifier and the first input/output terminal and between the first amplifier and the third input/output terminal; and a second variable phase shifting unit having an adjustable phase shift amount and provided one of between the second amplifier and the second input/output terminal and between the first amplifier and the fourth input/output terminal.

9. The directional coupler according to claim 8, further comprising:

a detecting unit which detects a phase and a power level of a signal outputted from the first input/output terminal, and determines, based on the phase and the power level, adjustment amounts for the phase shift amounts of the first variable phase shifting unit and the second variable phase shifting unit and adjustment amounts for the gains of the first amplifier and the second amplifier; and a controlling unit which, based on the adjustment amounts for the phase shift amounts and the adjustment amounts for the gains determined by the detecting unit, adjusts the phase shift amounts of the first variable phase shifting unit and the second variable phase shifting unit and the gains of the first amplifier and the second amplifier.

10. A directional coupler comprising;

first to fourth input/output terminals;

first to (2N−1)th (where N is an integer of 2 or more) phase shifting units which are connected in series between the first input/output terminal and the second input/output terminal, each of the first to (2N−1)th phase shifting units phase-shifting a supplied signal by 90° and outputting an output signal;

2N th to (4N−2)th phase shifting units which are connected in series between the third input/output terminal and the fourth input/output terminal, each of the 2Nth to (4N−2)th phase shifting units phase-shifting a supplied signal by 90° and outputting an output signal;

a first amplifier having an input connected to the third input/output terminal and an output connected to the first input/output terminal;

a (k+1)th (where k is an integer varying from 1 to 2N−2) amplifier having an output connected to connection point between the kth phase shifting unit and the (k+1)th phase shifting unit and an input connected to a connection point between the (k+2N−1)th phase shifting unit and the (k+2N)th phase shifting unit; and a 2Nth amplifier having an input connected to the fourth input/output terminal and an output connected to the second input/output terminal.

11. The directional coupler according to claim 10, wherein a gain of the (k+1)th amplifier is given by adding loss amounts of the kth phase shifting unit and the (k+2N−1)th phase shifting unit to a gain of the kth amplifier, and a gain of the 2Nth amplifier is given by adding the loss amounts of the (2N−1)th phase shifting unit and the (4N−2)th phase shifting unit to a gain of the (2N−1)th amplifier.

12. A transmitting/receiving apparatus comprising:

a directional coupler including first to fourth input/output terminals, a first phase shifting unit which is connected between the first input/output terminal and the second input/output terminal, phase-shifts a supplied signal by 90°, and outputs a resulting signal, a second phase shifting unit which is connected between the third input/output terminal and the fourth input/output terminal, phase-shifts a supplied signal by 90°, and outputs a resulting signal, a first amplifier having an input connected to the third input/output terminal and an output connected to the first input/output terminal, and a second amplifier having an input connected to the fourth input/output terminal and an output connected to the second input/output terminal;

an antenna which is connected to the second input/output terminal and transmits/receives signals;

a transmitter which generates and outputs a transmission signal;

a first amplifying unit including an input matching circuit and an output matching circuit, the first amplifying unit amplifying the transmission signal and outputting to the third input/output terminal;

a second amplifying unit including an input matching circuit and an output matching circuit, the second amplifying unit amplifying the signal outputted from the first input/output terminal and outputting an output signal; and a receiver which demodulates the output signal of the second amplifying unit.

13. The transmitting/receiving apparatus according to claim 12, wherein a gain of the second amplifier is given by adding loss amounts of the first phase shifting unit and the second phase shifting unit to a gain of the first amplifier.

14. The transmitting/receiving apparatus according to claim 12, wherein the first phase shifting unit and the second phase shifting unit are variable phase shifters having adjustable phase amounts and the first amplifier and the second amplifier are variable gain amplifiers having adjustable gains.

15. The transmitting/receiving apparatus according to claim 14, further comprising:

a detecting unit which detects a phase and power level of a signal outputted from the first input/output terminal and, based on the phase and the power level, determines adjustment amounts for phase shift amounts of the first phase shifting unit and the second phase shifting unit and adjustment amounts for the gains of the first amplifier and the second amplifier; and a controlling unit which, based on the adjustment amounts for the phase shift amounts and the adjustment amounts for the gains determined by the detecting unit, adjusts the phase shift amounts of the first phase shifting unit and the second phase shifting unit and the gains of the first amplifier and the second amplifier.

16. The transmitting/receiving apparatus according to claim 15, further comprising:

a compensating unit having an adjustable phase shift amount and gain, the compensating unit having one terminal connected to the third input/output terminal, performing a phase shift and amplification on a supplied signal and outputting an output signal; and an adder which adds an output signal from the first input/output terminal and the output signal from the compensating unit and outputs an output signal, wherein the detecting unit detects a phase and power level of the signal outputted from the adder and, based on the phase and the power level, determines adjustment amounts for the phase amounts of the first phase shifting unit, the second phase shifting unit and the compensating unit, and adjustment amounts for the gains of the first amplifier, the second amplifier and the compensating unit, and the controlling unit, based on the adjustment amounts for the phase shift amounts and the adjustment amounts for the gains determined by the detecting unit, adjusts the phase shift amounts of the first phase shifting unit, the second phase shifting unit, and the compensating unit and the gains of the first amplifier, the second amplifier and the compensating unit.

17. The transmitting/receiving apparatus according to claim 16, wherein the compensating unit includes:

a third phase shifting unit having an adjustable phase shift amount, the third phase shifting unit having one terminal connected to the third input/output terminal, phase-shifting a supplied signal and outputting an output signal; and a third amplifier having an adjustable gain, amplifying the output from the third phase shifting unit and outputting to the adder, wherein the detecting unit determines an adjustment amount for the phase shift amount of the third phase shifting unit and an adjustment amount for the gain of the third amplifier, and the controlling unit adjusts the phase shift amount of the third phase shifting unit and the gain of the third amplifier.

18. The transmitting/receiving apparatus according to claim 12, wherein the first amplifier and the second amplifier are variable gain amplifiers having adjustable gains, the transmitting/receiving apparatus further including:

a first variable phase shifting unit having an adjustable phase shift amount and provided one of between the first amplifier and the first input/output terminal and between the first amplifier and the third input/output terminal; and a second variable phase shifting unit having an adjustable phase shift amount and provided one of between the second amplifier and the second input/output terminal and between the first amplifier and the fourth input/output terminal.

19. The transmitting/receiving apparatus according to claim 18, further comprising:

a detecting unit which detects a phase and a power level of a signal outputted from the first input/output terminal, and determines, based on the phase and the power level, adjustment amounts for the phase shift amounts of the first variable phase shifting unit and the second variable phase shifting unit and an adjustment amount for the gains of the first amplifier and the second amplifier; and a controlling unit which, based on the adjustment amounts for the phase shift amounts and the adjustment amounts for the gains determined by the detecting unit, adjusts the phase shift amounts of the first variable phase shifting unit and the second variable phase shifting unit and the gains of the first amplifier and the second amplifier.

20. A transmitting/receiving apparatus comprising:

a directional coupler including first to fourth input/output terminals,

1st to (2N−1)th (where N is an integer of 2 or more) phase shifting units which are connected in series between the first input/output terminal and the second input/output terminal, each of the 1st to (2N−1)th phase shifting units phase-shifting a supplied signal by 90° and outputting an output signal, 2Nth to (4N−2)th phase shifting units which are connected in series between the third input/output terminal and the fourth input/output terminal, each of the 2Nth to (4N−2)th phase shifting units phase-shifting a supplied signal by 90° and outputting an output signal, a first amplifier having an input connected to the third input/output terminal and an output connected to the first input/output terminal, and a (k+1)th (where k is an integer varying from 1 to 2N−2) amplifier having an output connected to connection point between the kth phase shifting unit and the (k+1)th phase shifting unit and an input connected to a connection point between the (k+2N−1)th phase shifting unit and the (k+2N)th phase shifting unit, and a 2Nth amplifier having an input connected to the fourth input/output terminal and an output connected to the second input/output terminal;

an antenna which is connected to the second input/output terminal and transmits/receives signals;

a transmitter which generates and outputs a transmission signal;

a first amplifying unit including an input matching circuit and an output matching circuit, the first amplifying unit amplifying the transmission signal and outputting to the third input/output terminal;

a second amplifying unit including an input matching circuit and an output matching circuit, the second amplifying unit amplifying the signal outputted from the first input/output terminal and outputting an output signal; and a receiver which demodulates the output signal of the second amplifying unit.

21. The transmitting/receiving apparatus according to claim 20, wherein a gain of the (k+1)th amplifier is given by adding loss amounts of the kth phase shifting unit and the (k+2N−1)th phase shifting unit to a gain of the kth amplifier, and a gain of the 2Nth amplifier is given by adding the loss amounts of the (2N−1)th phase shifting unit and the (4N−2)th phase shifting unit to a gain of the (2N−1)th amplifier.

22. A transmitting/receiving apparatus comprising:

a directional coupler including first to fourth input/output terminals, a first phase shifting unit which is connected between the first input/output terminal and the second input/output terminal, phase-shifts a supplied signal by 90°, and outputs an output signal, a second phase shifting unit which is connected between the third input/output terminal and the fourth input/output terminal, phase-shifts a supplied signal by 90°, and outputs an output signal, a first amplifier having an input connected to the third input/output terminal and an output connected to the first input/output terminal, and a second amplifier having an input connected to the fourth input/output terminal and an output connected to the second input/output terminal;

an antenna which is connected to the second input/output terminal and transmits/receives signals;

a transmitter which generates and outputs a control signal;

a sinusoidal wave generator which outputs a sinusoidal transmission signal based on the control signal;

a first amplifying unit including an input matching circuit and an output matching circuit, the first amplifying unit amplifying the sinusoidal transmission signal and outputting to the third input/output terminal;

a second amplifying unit including an input matching circuit and an output matching circuit, the second amplifying unit amplifying the signal outputted from the first input/output terminal and outputting an output signal;

a third amplifying unit which amplifies the sinusoidal transmission signal and outputs an output signal;

a mixer which multiplies the output signal from the second amplifying unit and the output signal from the third amplifying unit and outputs an output signal;

a band pass filter which is supplied with the output signal from the mixer, passes signals of a predetermined band;

an A/D converter which converts the output signal of the band pass filter from an analog signal to a digital signal; and a receiver which decodes the output signal of the A/D converter.

* * * * *